(12) United States Patent
Pedersen et al.

(10) Patent No.: US 8,191,878 B2
(45) Date of Patent: Jun. 5, 2012

(54) MOUNTING DEVICE

(75) Inventors: Gunner Kamp Storgaard Pedersen, Skjern (DK); Anders Greve Bervang, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 208 days.

(21) Appl. No.: 12/598,208

(22) PCT Filed: Apr. 30, 2008

(86) PCT No.: PCT/EP2008/055333
§ 371 (c)(1),
(2), (4) Date: Mar. 1, 2010

(87) PCT Pub. No.: WO2008/132226
PCT Pub. Date: Nov. 6, 2008

(65) Prior Publication Data
US 2010/0150684 A1 Jun. 17, 2010

(30) Foreign Application Priority Data
Apr. 30, 2007 (DK) .................................. 2007 00642

(51) Int. Cl.
*B25B 1/22* (2006.01)
(52) U.S. Cl. ............................................ 269/71; 269/55
(58) Field of Classification Search ................... 269/55, 269/71
See application file for complete search history.

(56) References Cited

U.S. PATENT DOCUMENTS
6,868,646 B1 * 3/2005 Perina ......................... 52/745.17

FOREIGN PATENT DOCUMENTS
| DE | 19741988 A1 | | 4/1999 |
| EP | 1350953 A2 | | 10/2003 |
| EP | 1857670 A1 | | 11/2007 |
| JP | 2003184730 A | | 7/2003 |
| JP | 2005002875 | * | 1/2005 |
| JP | 2005002875 A | | 1/2005 |

OTHER PUBLICATIONS
European Patent Office, International Search Report and Written Opinion in PCT/EP2008/055333, Aug. 22, 2008.

* cited by examiner

*Primary Examiner* — Lee D Wilson
*Assistant Examiner* — Shantese McDonald
(74) *Attorney, Agent, or Firm* — Wood, Herron & Evans, LLP

(57) ABSTRACT

Mounting device for mounting or demounting a wind turbine blade (14) to or from a hub which is located on a nacelle at the top of a wind turbine tower (12). The mounting device comprises a sledge which comprises a support structure and a gripping structure. The support structure is adapted to releasably grip the wind turbine tower and adapted to guide the sledge along an outer surface of the wind turbine tower between a bottom end position and a top end position of the tower. The gripping structure is adapted to provide a releasable fixation of the wind turbine blade in a fixed orientation relative to the gripping structure. The sledge is adapted to be moved along the tower by a combination of the support structure and a cable connection to the top end. A tilt device (17) is arranged between the support structure and the gripping structure to facilitate tilting of the gripping structure relative to the support structure.

18 Claims, 14 Drawing Sheets

MOUNTING DEVICE

TECHNICAL FIELD

The present invention relates to a mounting device for mounting and/or demounting wind turbine components, such as wind turbine blades. Furthermore, the invention relates to a method of mounting and/or demounting such wind turbine components, e.g. during exchange of the components or in connection with the erection of a new wind turbine.

BACKGROUND OF THE INVENTION

Modern wind turbines comprise a plurality of wind turbine rotor blades, typically three rotor blades, each blade today having a weight of up to 13 tons and a length of up to 49 meters. At one end the rotor blade is to be attached to the wind turbine hub today up to 125 meters above the ground. This end has a diameter typically about 1-4 meters, and often it comprises about 90 bolts to be fixed at the hub in order to fix the rotor blade hereto.

Usually, wind turbines are erected in places in which the wind conditions are advantageous, e.g. at places with few obstacles blocking or altering the path of the wind. Consequently, wind turbines are often erected in more or less remote places, typically with a poor infrastructure in terms of road quality. Furthermore, wind turbine sites may be scattered over many square meters. The wind turbines may also be erected off-shore, where the wind conditions likewise may be advantageous.

The positioning at remote places and/or the size of the wind turbine sites may cause problems in relation to the necessary maintenance of the wind turbine components, e.g. the wind turbine rotor blades. These problems have recently increased due to the increasing size of the wind turbines.

As an example, wind turbine generators and wind turbine towers can be struck by lighting that can damage the generator or wind turbine rotor blades, thus necessitating repair or replacement hereof or parts hereof.

Previously, large mobile cranes have been used in connection with maintenance, repair, and exchange of wind turbine components. However, with a poor infrastructure and/or a considerable size of the wind turbine sites, the transportation of a crane to the wind turbine site can be both costly and time consuming.

SUMMARY OF THE INVENTION

It is an object of embodiments of the present invention to provide a mounting or demounting device for mounting or demounting wind turbine components to or from a wind turbine tower and to provide an improved method of mounting or demounting such components.

In a first aspect, the invention provides a mounting device for mounting or demounting a wind turbine blade to or from a hub which is located at a top end of a wind turbine tower, the mounting device comprising a sledge, the sledge comprising a support structure and a gripping structure, the support structure being adapted to releasably grip the wind turbine tower and to guide the sledge along an outer surface of the wind turbine tower between a bottom end position and a top end position of the tower, the gripping structure being adapted to provide a releasable fixation of the wind turbine blade in a fixed orientation relative to the gripping structure, wherein the sledge is adapted to be moved along the tower by a combination of the support structure and a cable connection to the top end.

The turbine blade may be mounted or demounted with or without a blade bearing, thus allowing for the exchange of blade bearings too. The turbine blade can be mounted to or demounted from a hub which may be located on a nacelle on the top of the turbine tower.

The mounting device may be moved to a wind turbine tower by a truck or in case of an off-shore wind turbine site by ship, and may be attached to the tower with one or more cables connected to a hoist which may be positioned at a nacelle on top of the turbine tower or at the ground next to the wind turbine tower. When positioning a hoist at the ground, a pulley may be positioned on the nacelle or another part on top of the turbine tower. The support structure may grip around the tower near the bottom end hereof, thus being able to stabilize the positioning of the mounting device.

A turbine blade, e.g. for replacement, may in a similar manner be carried to the site by a truck, and the blade may be fixed in the gripping structure while still on the truck, thus gripping it and removing it here from without the use of an external crane. Having fixed the blade in the gripping structure, the cable connection may be used to force the sledge along the turbine tower to the top end of the tower where the blade can be fixed to the turbine hub. Previously, a damaged or worn-out blade may have been removed using the mounting device.

The mounting device may thus facilitate exchange of wind turbine blade since it enables exchange without the use of an external crane.

The support structure may be adapted for a first configuration in which it grips around a wind turbine tower and second configuration in which it guides the sledge along an outer surface of a wind turbine tower. As an example, the support structure may grip around a turbine tower in the first configuration when a turbine blade is fixed in the gripping structure. Subsequently, the sledge may be guided along the outer surface of the tower without the support structure gripping around the tower. In this second configuration, the weight of the mounting device and the turbine blade may be sufficient to keep the mounting device guided along the outer surface of the tower. In an alternative embodiment, the sledge may be guided along the turbine tower while the support structure grips around the tower.

The sledge may be formed to enable reorientation of a turbine blade by transfer of torque from the sledge to a wind turbine tower. If delivering a wind turbine blade on a truck or by ship, it may due to the length of the blade typically be delivered in a substantially horizontal orientation. The gripping structure may fix the blade, and the sledge with the blade may be elevated by the use of the cable connection. At a given height above the ground, the turbine blade may be reoriented to an orientation being substantially vertical or an orientation being close to vertical, e.g. being 10° from vertical, in order to facilitate attachment hereof to the hub. When reorienting the blade torque may thus be transferred from the sledge to the tower via the support structure.

In order to be able to grip around or embrace a wind turbine tower, the support structure may comprise embracing means, e.g. in the form of two curve-shaped arms, or a ring or wire adapted to extend circumferentially around the tower. In embodiments comprising curve-shaped arms, the wind turbine tower may be partly or fully embraced depending on the length of the arms. The arms may be movable away from each other towards an open position in which the support structure can be arranged in a position ready to catch an adjacent wind turbine tower. And the arms may be movable toward each other to a gripping position in which the tower is caught, thus gripping around the tower. In an alternative embodiment, the support structure may comprise two sets of curve-shaped arms which preferably are positioned at a top end and a bottom end of the sledge.

The movement of the arms may be controlled by a control unit which may be controlled manually by an operator on the ground or an operator at the top of the tower, e.g. being in a nacelle or in the hub. The arms may be wirelessly controlled. The movement may be controlled by one or more actuators being e.g. hydraulic, electric or pneumatic. In an alternative embodiment, the support structure may comprise fixations such as a suction device, magnets or other means for maintaining a close contact between the sledge and an outer surface of the tower. In a further alternative, the fixations may be combined with the embracing means.

In order to facilitate movement of the sledge along a wind turbine tower, the support structure may comprise rollers adapted to roll on an outer surface of the tower. The rollers may be arranged to form contact along a segment of an outer surface of the tower. In a preferred embodiment, the rollers may be white or light-coloured rubber rollers in order to allow the sledge to be forced along the tower without leaving footprints on or damaging the outer surface of the tower. Alternatively, the support structure may comprise a coating or a surface layer to protect the tower, e.g. a textile, rubber, Teflon, wood, or similar surface. The coating or surface layer may additionally provide a low friction.

The gripping structure may be adapted to fix a wind turbine blade at a balance point. This may be obtained by a shape of the gripping structure that ensures solid contact with the outer surface of a blade at the balance point of the blade, thus ensuring a firm grip at this point. The balance point may be chosen as the centre of gravity of the blade. By fixing the blade at a balance point or symmetrically around the balance point, less effort is required to reorient the blade from one orientation to another.

The gripping structure may comprise a set of two jaws. When using a set of jaws, fixation may be achieved by applying a pressure at each side of the turbine blade.

The gripping structure may comprise an actuator for movement of the jaws from an open position in which a turbine blade can be arranged between the jaws to a fixation position in which the blade is fixed. The actuator may be e.g. hydraulic, electric or pneumatic. In embodiments comprising a support structure with curve-shaped arms, the movement of the jaws may be controlled by a control unit controlling these arms, or alternatively the jaws may be controlled by a separate control unit. The control unit may be adapted for wireless communication with the gripping structure.

Each jaw may form two gripping points which in the fixation position form contact with a turbine blade arranged between the jaws. Having two gripping points at each jaw allows for fixing of the blade symmetrically around the balance point.

The jaws may at the gripping points comprise a curved surface following the surface of the specific turbine blade to be mounted or demounted, thus enabling a firm grip in order to increase safety during handling of the blade. Furthermore, the jaws may at the gripping points comprise a friction enhancing layer in order to facilitate fixation of the blade even during conditions where the outer surface of the blade may be slippery, e.g. when the blade is wet, also increasing safety during handling. Such a layer may e.g. be a rubber layer, e.g. with a surface texture similar to that of a tire. Alternatively or additionally, the jaws may at the gripping points comprise a suction device allowing for further enhancement of safety.

In case of failure of an actuator moving the jaws or a control unit controlling such an actuator, a turbine blade fixed in the gripping structure may be dropped since the jaws may be unintentionally opened. In order to prevent such dangerous situations and in order to enhance safety even more, the gripping structure may further comprise a locking member preventing movement of the jaws from the fixation position.

The mounting device may further comprise a tilt device being arranged between the support structure and the gripping structure in order to facilitate tilting of the gripping structure relative to the support structure around at least two axes. This tilt device may facilitate tilting of the blade from a substantially horizontal orientation in which it may have been transported to the site, e.g. by truck or by boat, to a substantially vertical orientation in which a part of the transportation to a top end of the tower may be carried out. When the upper end of the blade is in proximity of the hub, the blade may be tilted again in order to position it correctly in relation to the hub. Depending on the size of the wind turbine and the layout of the hub, the blade may be tilted up to approximately 10° in order to position it correctly. Other tilt angles may also be applicable. Before tilting the blade at an upper end of the wind turbine tower, the support structure may grip around the tower in order to stabilize the sledge, thus allowing for even tilting of the blade.

In a preferred embodiment, two of the at least two axes may be perpendicular to each other and perpendicular to a central axis of a wind turbine tower when the sledge is guided along the wind turbine tower by the support structure.

Having tilted the turbine blade in order to position it correctly in relation to the hub, an axial displacement may be needed to enable connection between the blade root and a blade bearing mounted on the hub. Thus, the mounting device may further comprise a displacement structure adapted to displace the gripping structure relative to the sledge. This displacement may be done by an actuator, e.g. by one or more jacks, which displaces the gripping structure in relation to the sledge along the centre axis of the blade.

The gripping structure may be adapted for displacement in at least one direction. As described above, the turbine blade may be elevated in a substantially horizontal orientation and tilted firstly around one axis and secondly around another axis. The first tilt angle may be approximately 90° in order to reorient the blade from a substantially horizontal orientation into a substantially vertical orientation. Subsequently, the blade may be elevated again or it may be tilted again in order to position it correctly in relation to the hub.

After having obtained the correct position of the blade, the blade may firstly be displaced substantially horizontal, i.e. away from the turbine tower and secondly be displaced substantially vertically in a tilted orientation in order to facilitate attachment to the hub. During the second substantially vertical displacement of the blade, the blade may simultaneously be horizontally displaced in order to be correctly received in the hub, the blade may e.g. be moved towards the tower again. The movement of the blade may thus be in a straight path along an axis being inclined in relation to the centre axis of the turbine tower, i.e. the gripping structure may be adapted for displacement in a straight path at an angle to the tower. The angle between the inclined axis and the centre axis may be approximately 10°. Depending on the size of the turbine tower and the layout of the hub, smaller and larger angles may be applicable.

Furthermore, the gripping structure may be adapted for displacement in at least two tilt angles. In the above described embodiment, the turbine blade is displaced twice after being tilted into an orientation adapted to the hub. In an alternative embodiment, the turbine blade may be substantially vertically oriented during the first displacement, which may be followed by a second tilting before a second displacement. In a further alternative embodiment of the mounting device, the order and number of tilts and displacements of the turbine blade may be freely chosen.

The mounting device may further comprise a cable support which may be adapted to provide a variable point of attach for the cable connection. By a variable point of attach, it may be possible to vary the force by which the sledge is biased towards the turbine tower, thus providing balance of the sledge and the wind turbine blade. This facilitates a more even guidance thereof along the wind turbine tower. Furthermore, it may be advantageous to vary the point of attach, when displacing a turbine blade away form the turbine tower.

In a second aspect, the invention provides a mounting device for mounting or demounting a wind turbine blade to or from a hub which is located at a top end of a wind turbine tower, the mounting device comprising a sledge, the sledge comprising a support structure, a gripping structure, and a tilt device, the support structure being adapted to guide the sledge along an outer surface of the wind turbine tower between a bottom end position and a top end position of the tower, the gripping structure being adapted to provide a releasable fixation of the wind turbine blade in a fixed orientation relative to the gripping structure, and the tilt device being arranged between the support structure and the gripping structure to facilitate tilting of the gripping structure relative to the support structure around at least two axes.

The mounting device may further comprise drive means which may comprise motor means for forcing the sledge along the wind turbine tower. Additionally, the drive means may comprise a winch.

It should be understood, that the above-mentioned features of the first aspect of the invention may also be applicable to the mounting device of the second aspect of the invention.

In a third aspect, the invention provides a method of mounting or demounting a wind turbine blade to or from a hub which is located at a top end of a wind turbine tower, the method comprising the steps of:

providing a sledge and drive means adapted to drive the sledge along a wind turbine tower, providing a support structure to enable guidance of the sledge along an outer surface of the wind turbine tower between a bottom end position and a top end position of the tower, providing a gripping structure to provide a releasable fixation of the wind turbine blade in a fixed orientation relative to the gripping structure, gripping the turbine tower by use of the support structure, fixing a wind turbine blade by use of the gripping structure, and elevating the wind turbine blade by use of the drive means.

The method may further comprise a step in which the support structure grips around a wind turbine tower after having guided the sledge along an outer surface of the wind turbine tower. As an example, the support structure may grip around a turbine tower when the gripping structure fixes a wind turbine blade. Subsequently, the wind turbine blade may be elevated by the drive means. When elevating the blade, the support structure may have loosened its grip around the tower. And after having guided the sledge along the wind turbine tower, the support structure may grip around the tower again. In an alternative embodiment, the support structure maintains its grip during movement of the sledge along the wind turbine tower.

The method may further comprise a step of reorienting the wind turbine blade. The blade may be reoriented more than once. As an example, the blade may be fixed in a substantially horizontal orientation and elevated to at given height above ground in this orientation. After having reached a desired height, it may be reoriented to a substantially vertical orientation.

Subsequently, the blade may be reoriented for the second time. The second reorientation is preferably in proximity of the hub and is done by tilting of the blade. Finally, the blade may be displaced in relation to the sledge along the centre axis of the blade and may in a non-vertical orientation be further displaced along a straight path at an angle to the tower in order to be attached to the hub. The first displacement may be substantially horizontal and may be up to 3 meters depending on the size of the wind turbine. For very large wind turbines, the displacement may be even larger.

The blade may be fixed without modifying the blade. It is thus possible to fix the blade without adding gripping hooks, apertures or the like to the blade.

It should be understood, that the above-mentioned features of the first and second aspects of the invention may also be applicable in connection with the method of the third aspect of the invention.

In a fourth aspect, the invention provides a lifting device for lifting a wind turbine component to or from a wind turbine tower, the lifting device comprising a sledge and drive means, the sledge comprising a support structure and a gripping structure, the support structure being adapted to grip around the wind turbine tower and to guide the sledge along an outer surface of the wind turbine tower between a bottom end position and a top end position of the tower, the gripping structure being adapted to provide a releasable fixation of the wind turbine component in a fixed orientation relative to the gripping structure, and the drive means comprising motor means for forcing the sledge along the wind turbine tower.

It should be understood, that the above-mentioned features of the first, second, and third aspects of the invention may also be applicable to the lifting device of the fourth aspect of the invention.

BRIEF DESCRIPTION OF THE DRAWINGS

Embodiments of the invention will now be further described with reference to the drawings, in which.

DETAILED DESCRIPTION OF THE DRAWINGS

Figure 1:
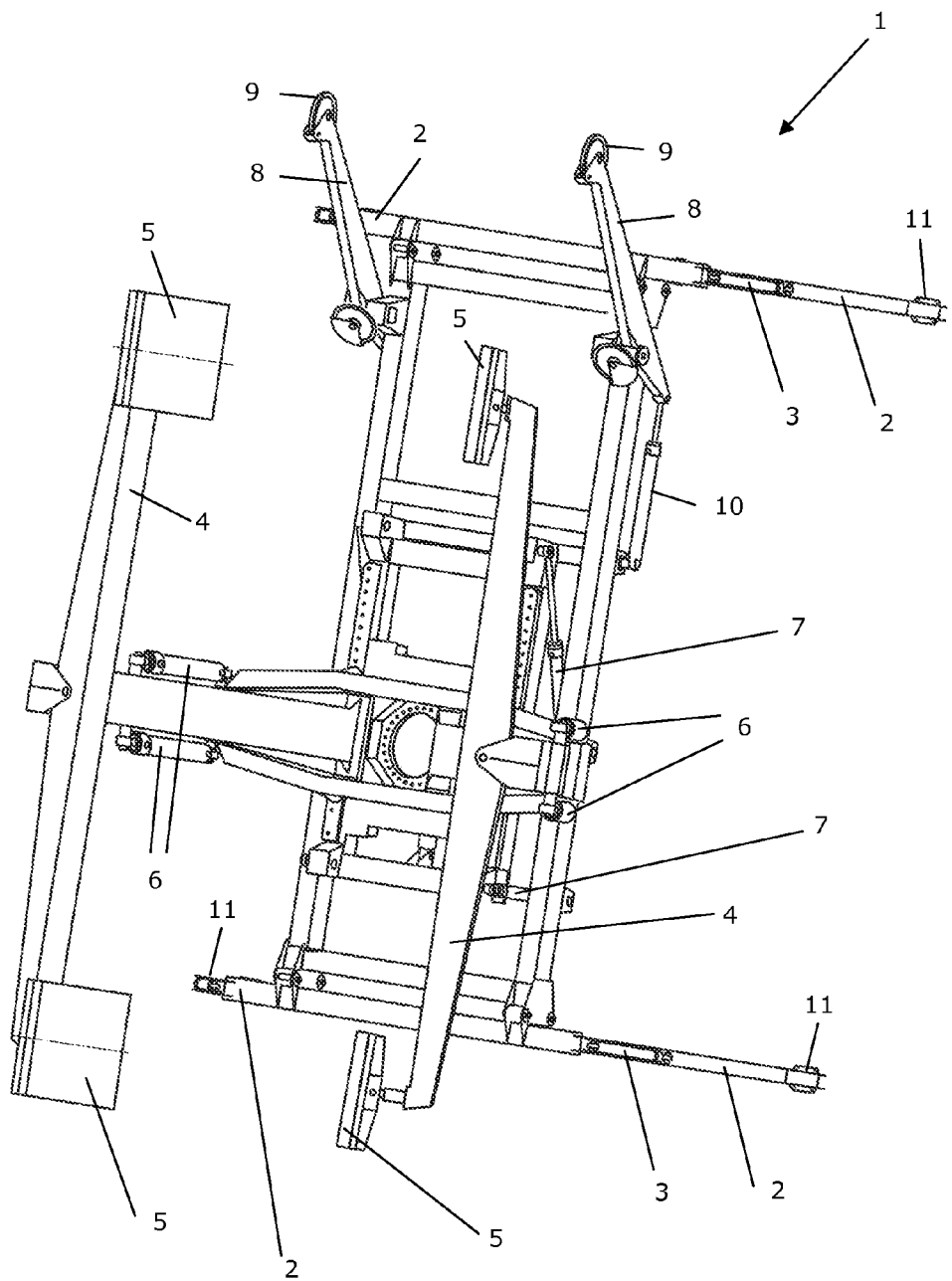
FIGS. 1 and 2 illustrate an embodiment of a sledge of a mounting device according to the invention.
Figure 2:
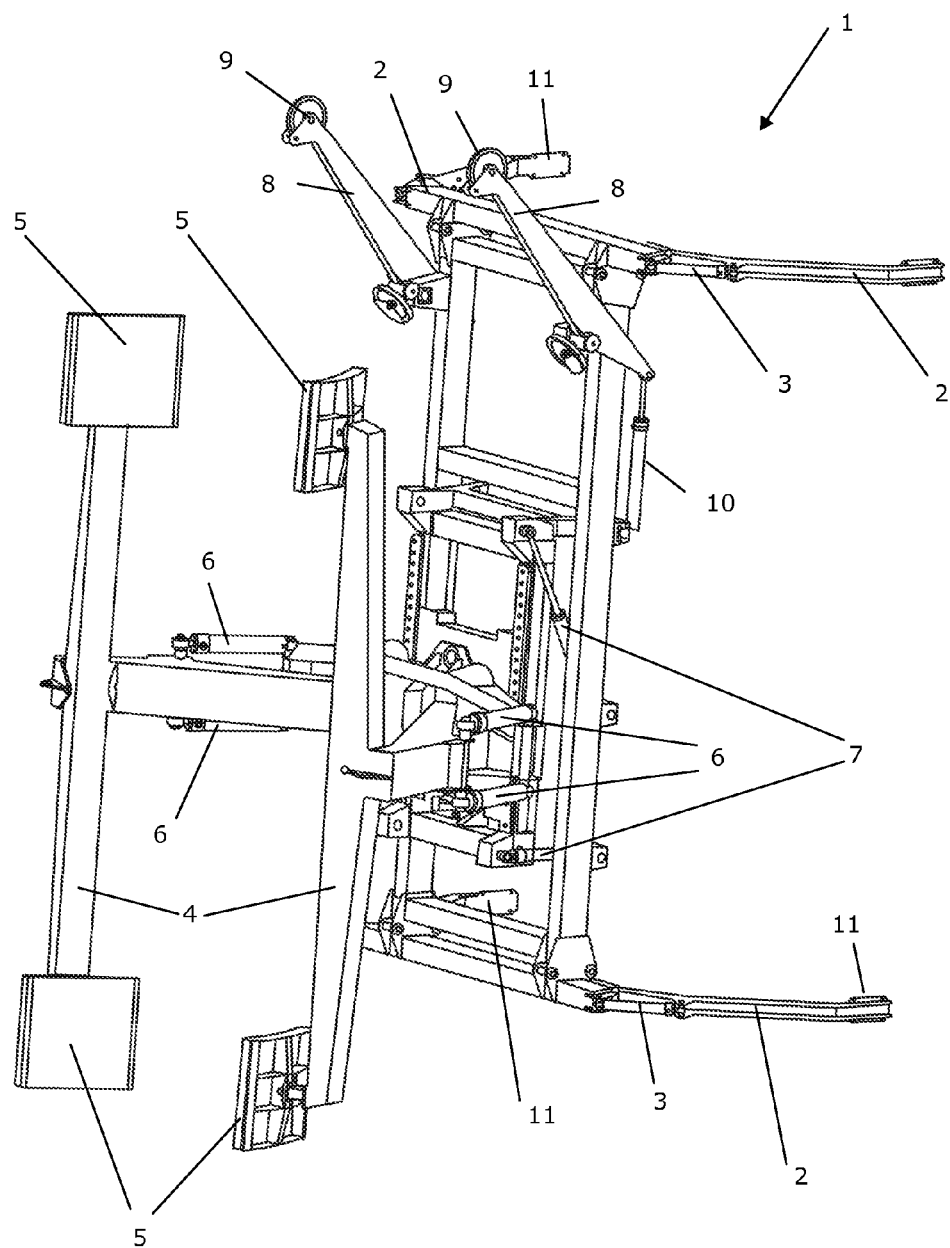

FIGS. 1 and 2 illustrate an embodiment of a sledge 1 of a mounting device according to the invention. The sledge 1 is illustrated at different views. The sledge 1 comprises a support structure being adapted to grip around a wind turbine tower (not shown) and being adapted to guide the sledge along an outer surface of the wind turbine tower. Furthermore, the sledge 1 comprises a gripping structure being adapted to provide a releasable fixation of a wind turbine blade (not shown) in a fixed orientation relative to the gripping structure.

In the illustrated embodiment, the support structure comprises two sets of curve-shaped arms 2. The arms 2 are movable away from each other towards an open position in order to be able to arrange the support structure in a position ready to catch an adjacent wind turbine tower. And the arms 2 are movable toward each other to a gripping position in which the tower is caught. The movement of the arms 2 is controlled by actuators 3.

In the illustrated embodiment, the gripping structure comprises a set of two jaws 4. Each jaw 4 forms two gripping points 5 which in a closed position, i.e. a fixation position, form contact with a turbine blade (not shown) arranged between the jaws 4. Furthermore, the gripping structure comprises four actuators 6 for movement of the jaws 4 from an open position in which a turbine blade can be arranged between the jaws 4 to a fixation position in which the blade (not shown) is fixed.

Furthermore, the sledge 1 comprises a tilt device which facilitates tilting of the gripping structure relative to the support structure. In the illustrated embodiment, this is done by four actuators 7 (only two of them are shown). The actuators 7 allow for tilting of the gripping structure along an axis being perpendicular to the tower (not shown).

The sledge 1 also comprises a cable support which is adapted to provide a variable point of attach for the cable connection. By a variable point of attach, it is possible to vary the position of the centre of gravity, thus providing balance of the sledge 1 and the wind turbine blade (not shown). In the illustrated embodiment, the cable support comprises two cable guiding arms 8 each provided with a free spinning wheel 9. The point of attach can be varied by the support actuators 10 (only one of them is shown).

The support structure comprises fixations in the form of a suction device 11 at the end of each arm 2 in order to maintaining a close contact between the sledge 1 and an outer surface of the tower (not shown).

Figure 3:
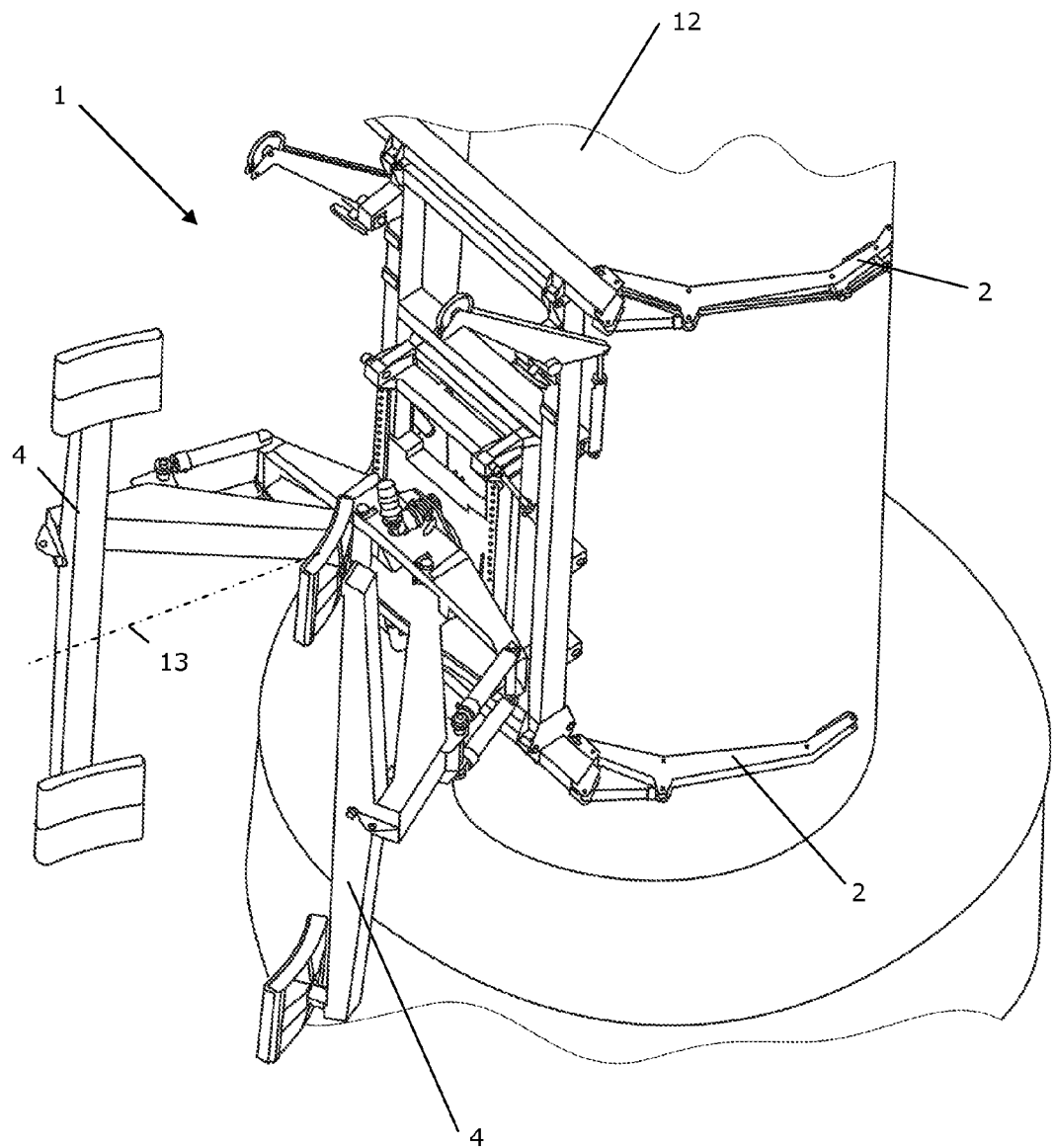
FIG. 3 illustrates a sledge with a support structure gripping around a wind turbine tower.

FIG. 3 illustrates a sledge 1 with a support structure gripping around a wind turbine tower 12 by the use of two sets of curve-shaped arms 2 at a lower end of the tower 12. The arms 2 partly embrace the tower 12. The jaws 4 are positioned substantially vertical. In a preferred embodiment, the jaws 4 will be tilted around a centre axis 13 of the gripping structure to a substantially horizontal orientation before fixing a turbine blade with the gripping structure, the centre axis 13 being substantially perpendicular to the tower 12.

Figure 4:
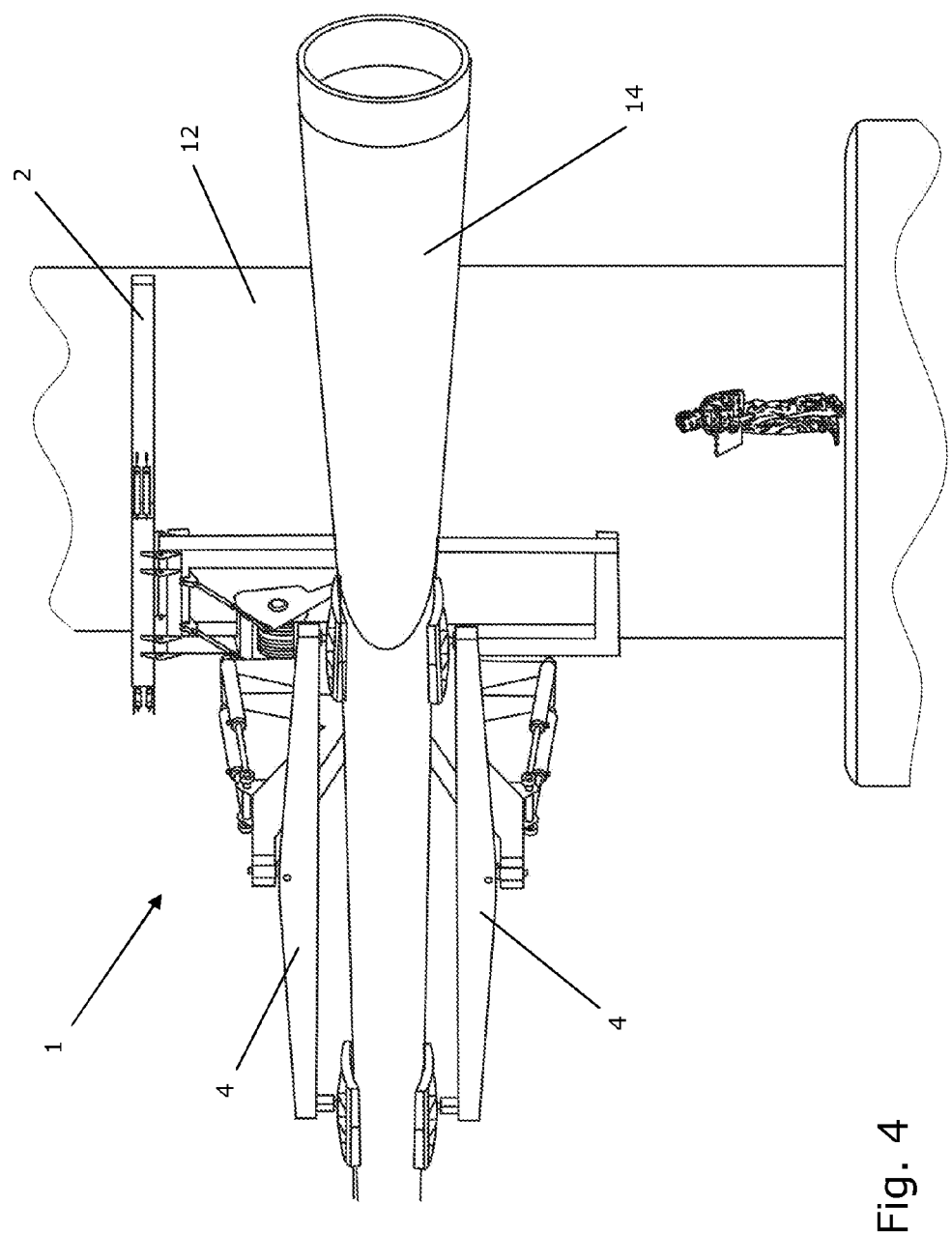
FIGS. 4-7 illustrate a sledge with a support structure gripping around a tower and with a gripping structure fixing a blade in a substantially horizontal orientation.
Figure 5:
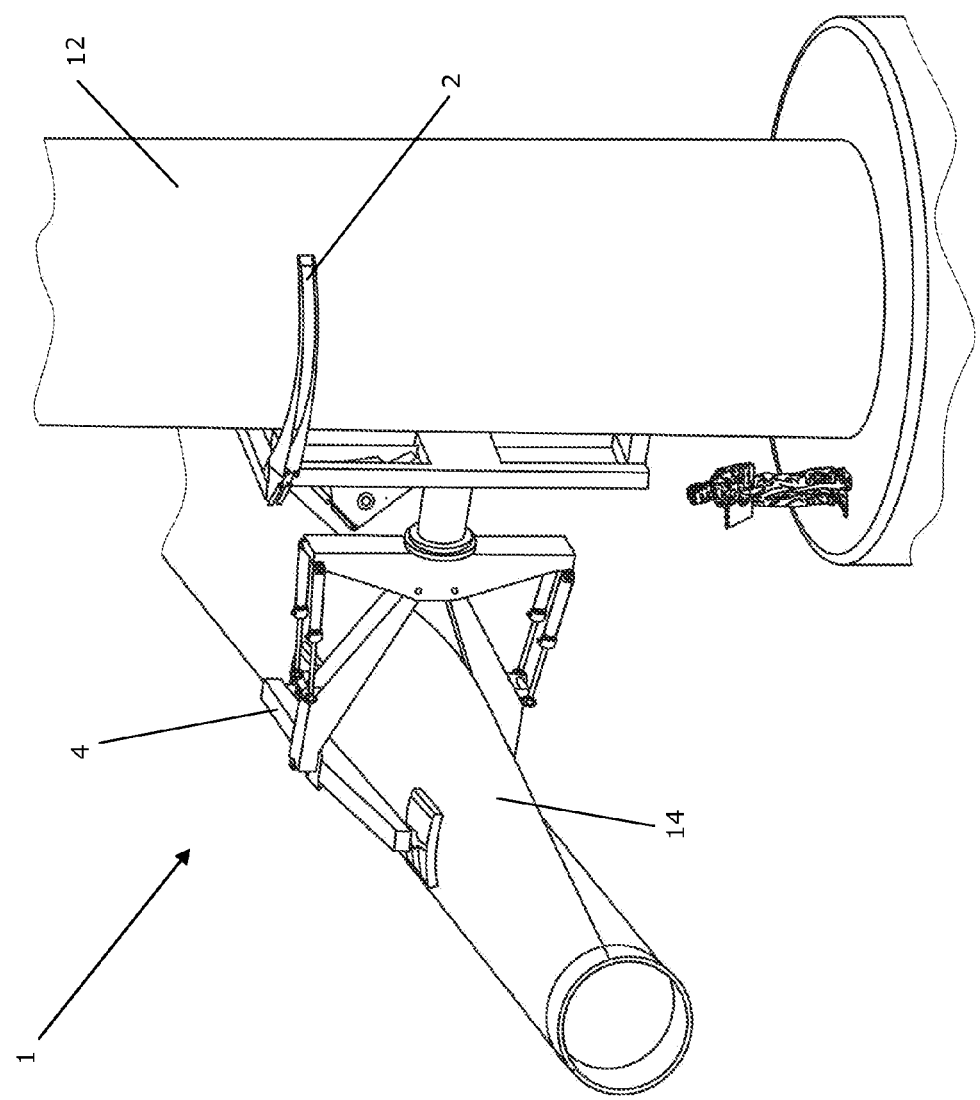
Figure 6:
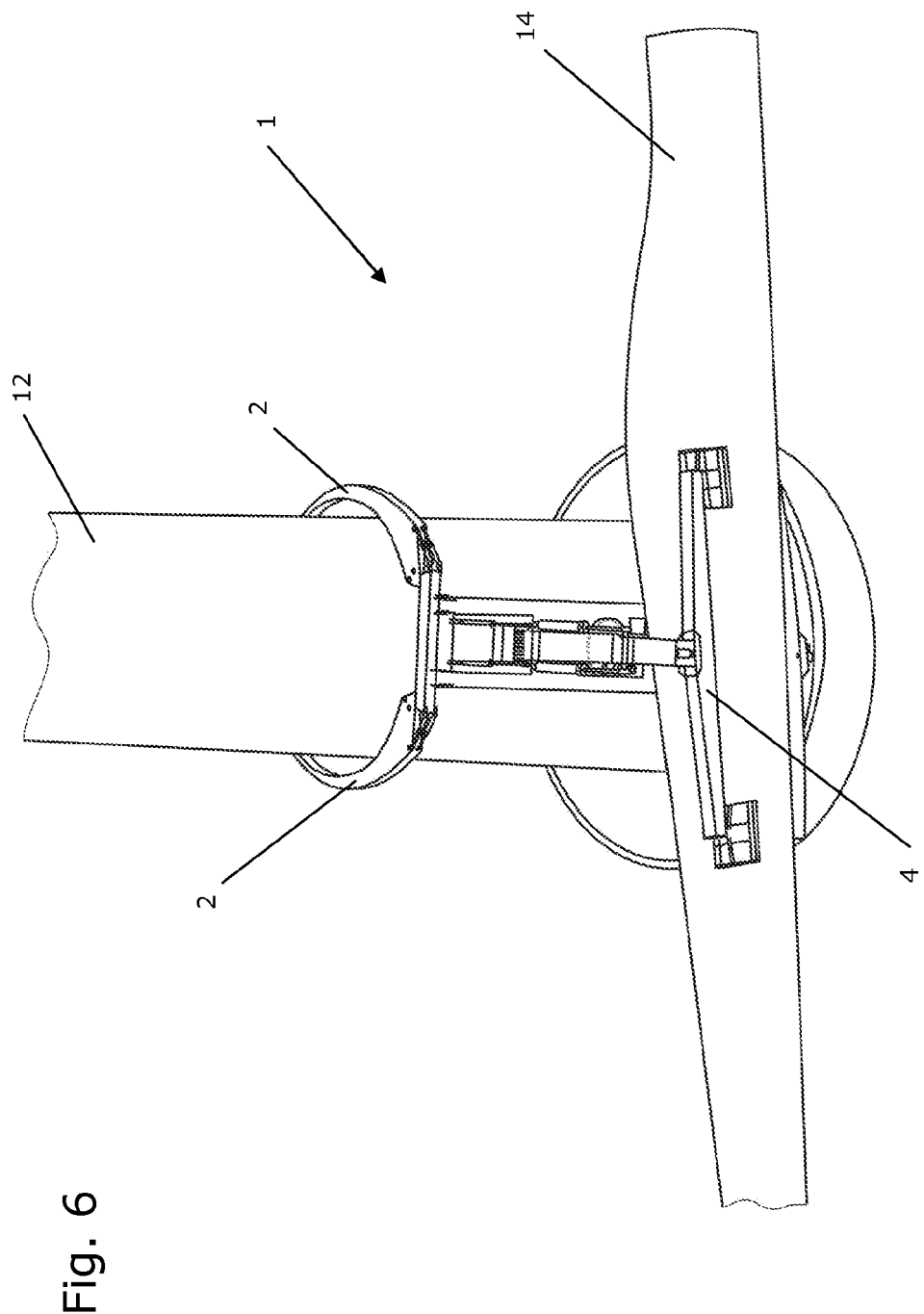
Figure 7:
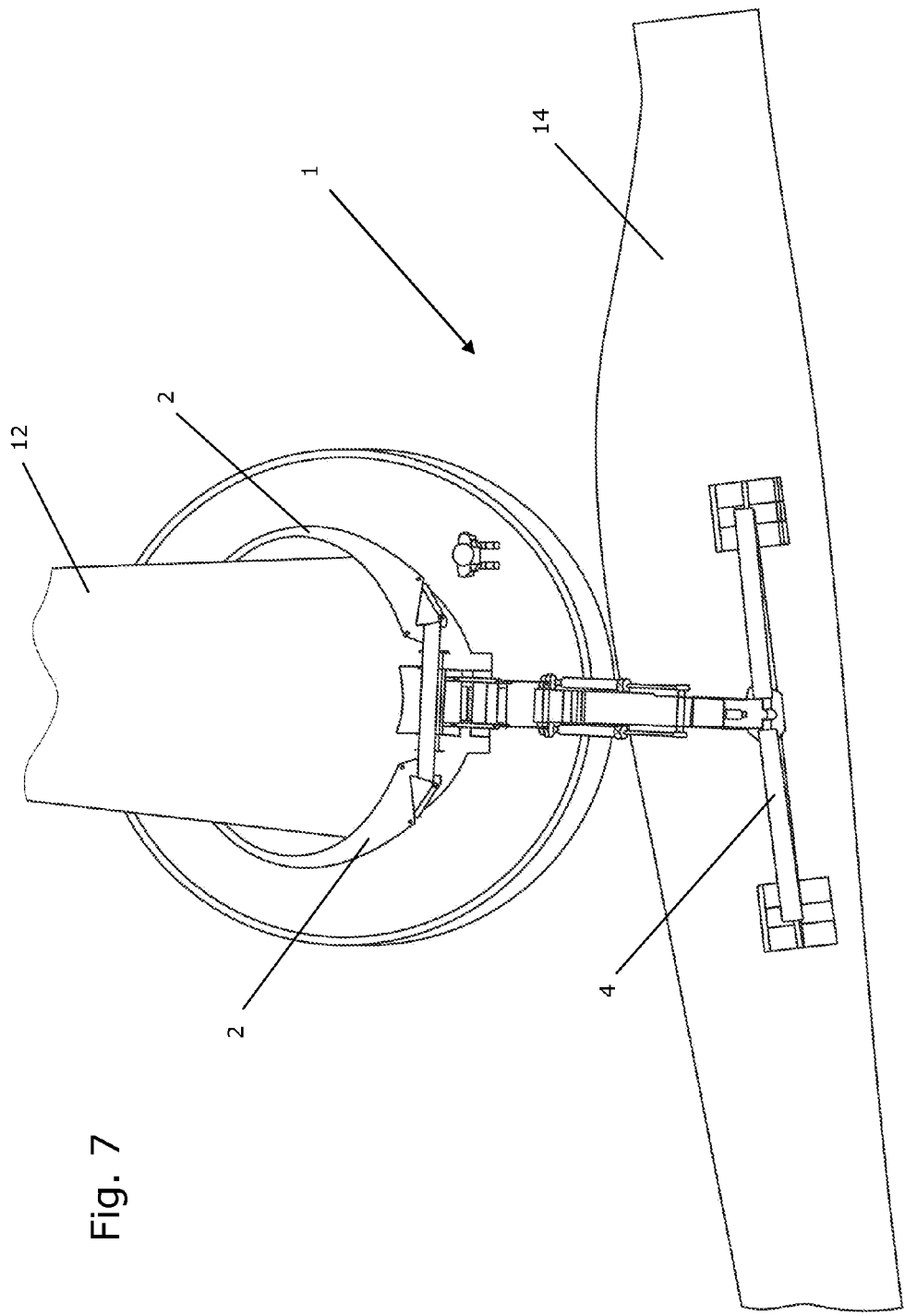

FIGS. 4-7 illustrate an embodiment of a sledge 1 with a support structure gripping around a tower 12 with two curve-shaped arms 2 (in FIGS. 4 and 5 only one arm 2 is shown). The gripping structure fixes a turbine blade 14 in a substantially horizontal orientation by the use of two jaws 4 (only FIG. 4 illustrates both jaws 4).

Figure 8:
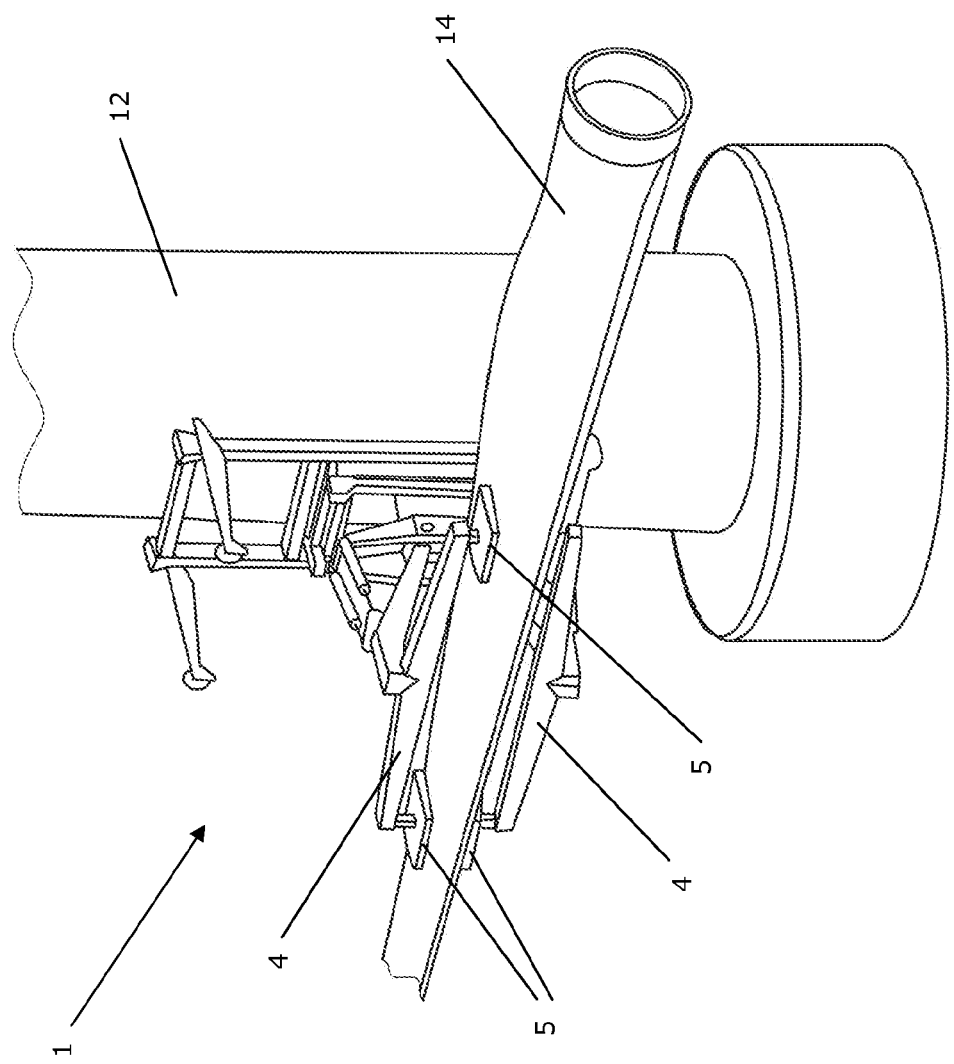
FIG. 8 illustrates a sledge at the lower end of a tower with a gripping structure fixing a blade.

FIG. 8 illustrates a sledge 1 at the lower end of a tower 12 with a gripping structure fixing a turbine blade 14 between two jaws 4 each having two gripping points 5 (only three of them can be seen).

Figure 9:
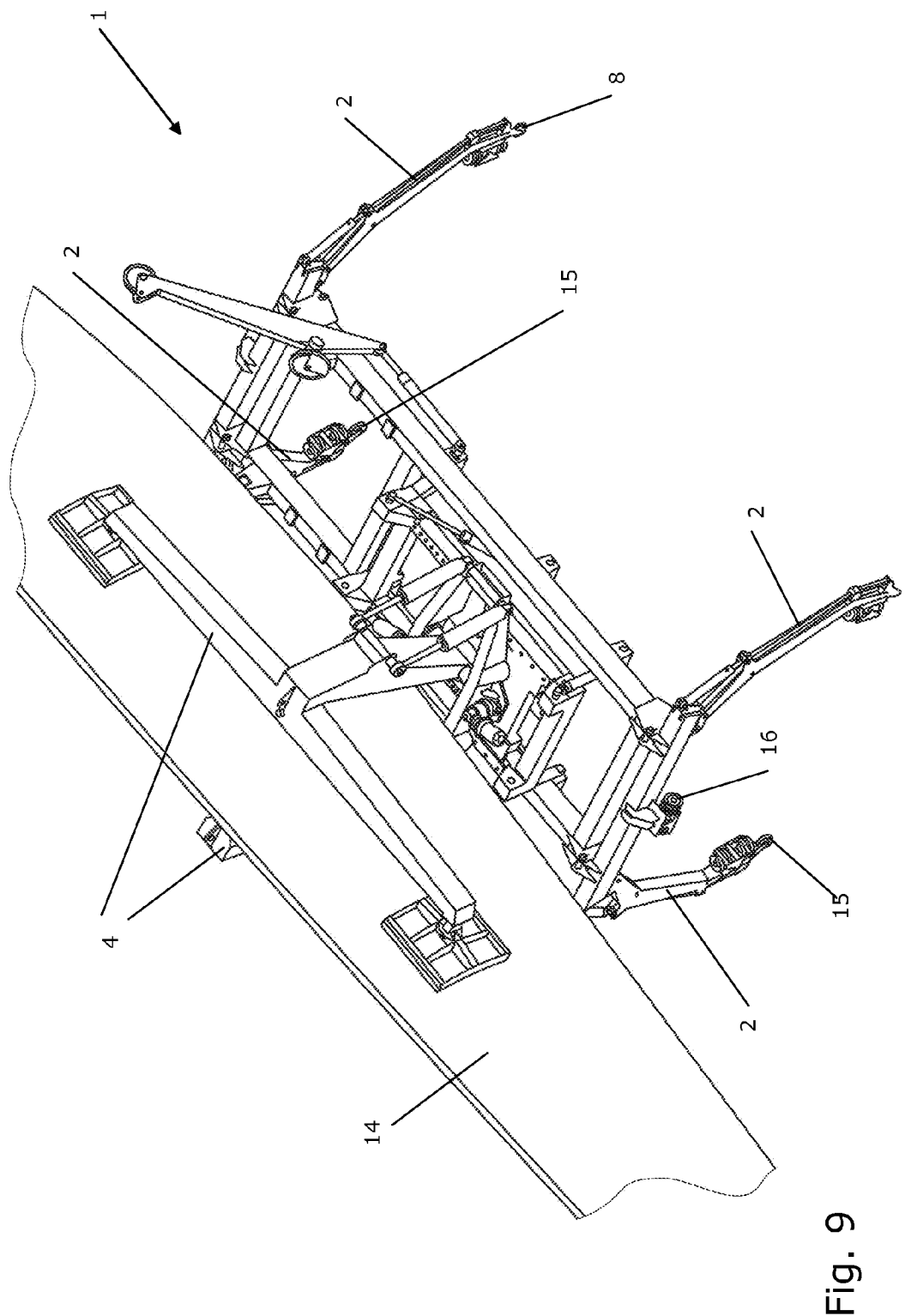
FIG. 9 illustrates a sledge with a gripping structure fixing a blade.

FIG. 9 illustrates a sledge 1 with a gripping structure fixing a turbine blade 14 between two jaws 4. Each of the curve-shaped arms 2 being adapted to grip around a turbine tower (not shown) comprises a roller 15 being adapted to roll on the outer surface of a turbine tower in order to allow the sledge 1 to be forced along the tower without leaving footprint on or otherwise damaging the outer surface of the tower. Likewise, a set of rollers 16 is positioned at a centre part of the sledge 1.

Figure 10:
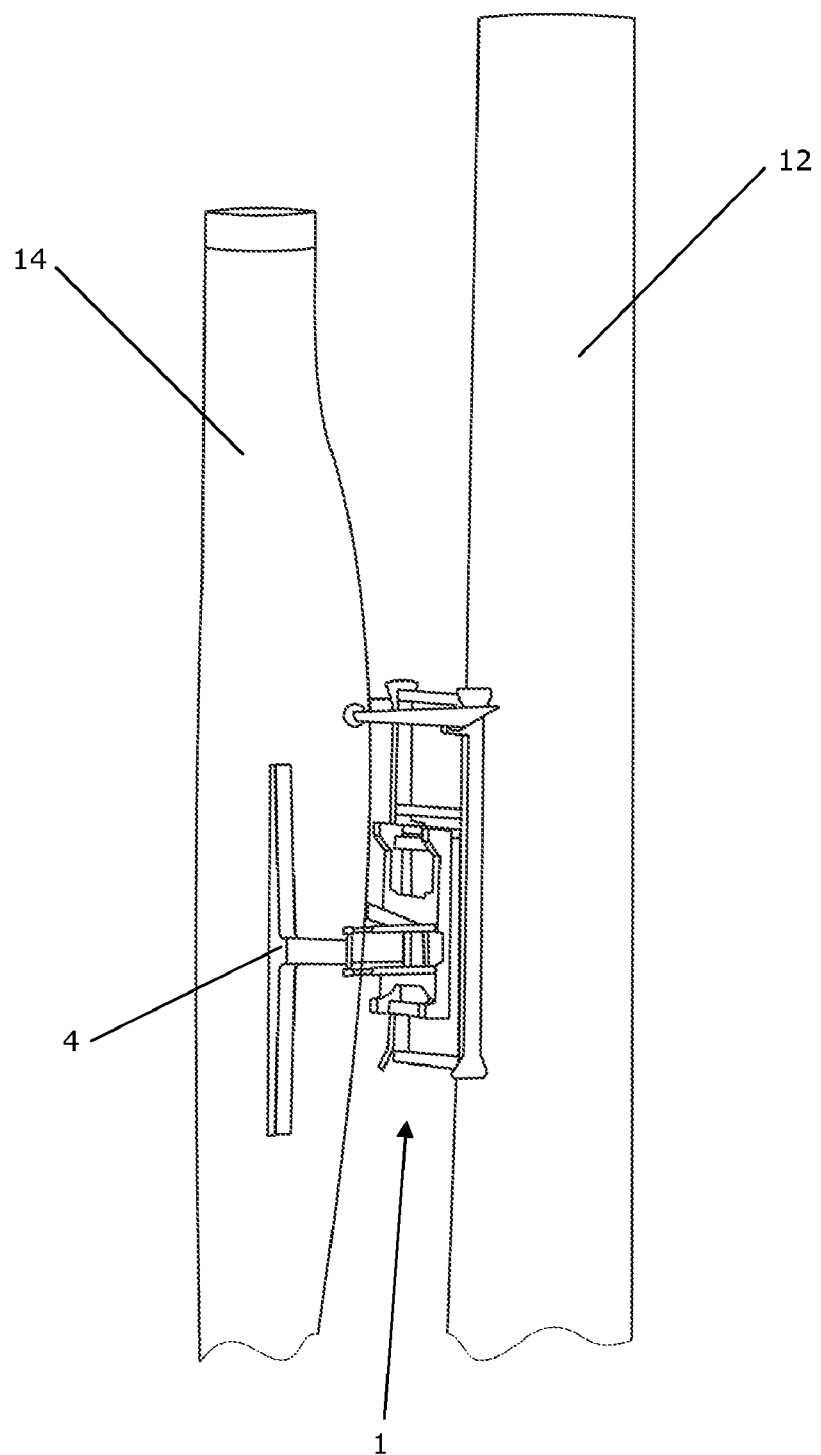
FIG. 10 illustrates a sledge being moved along the tower and with a gripping structure with a blade fixed in a substantially vertical orientation.

FIG. 10 illustrates a sledge 1 being moved along a turbine tower 12 with a gripping structure having a turbine blade 14 fixed between a set of jaws 4, the blade 14 being moved in a substantially vertical orientation.

Figure 11:
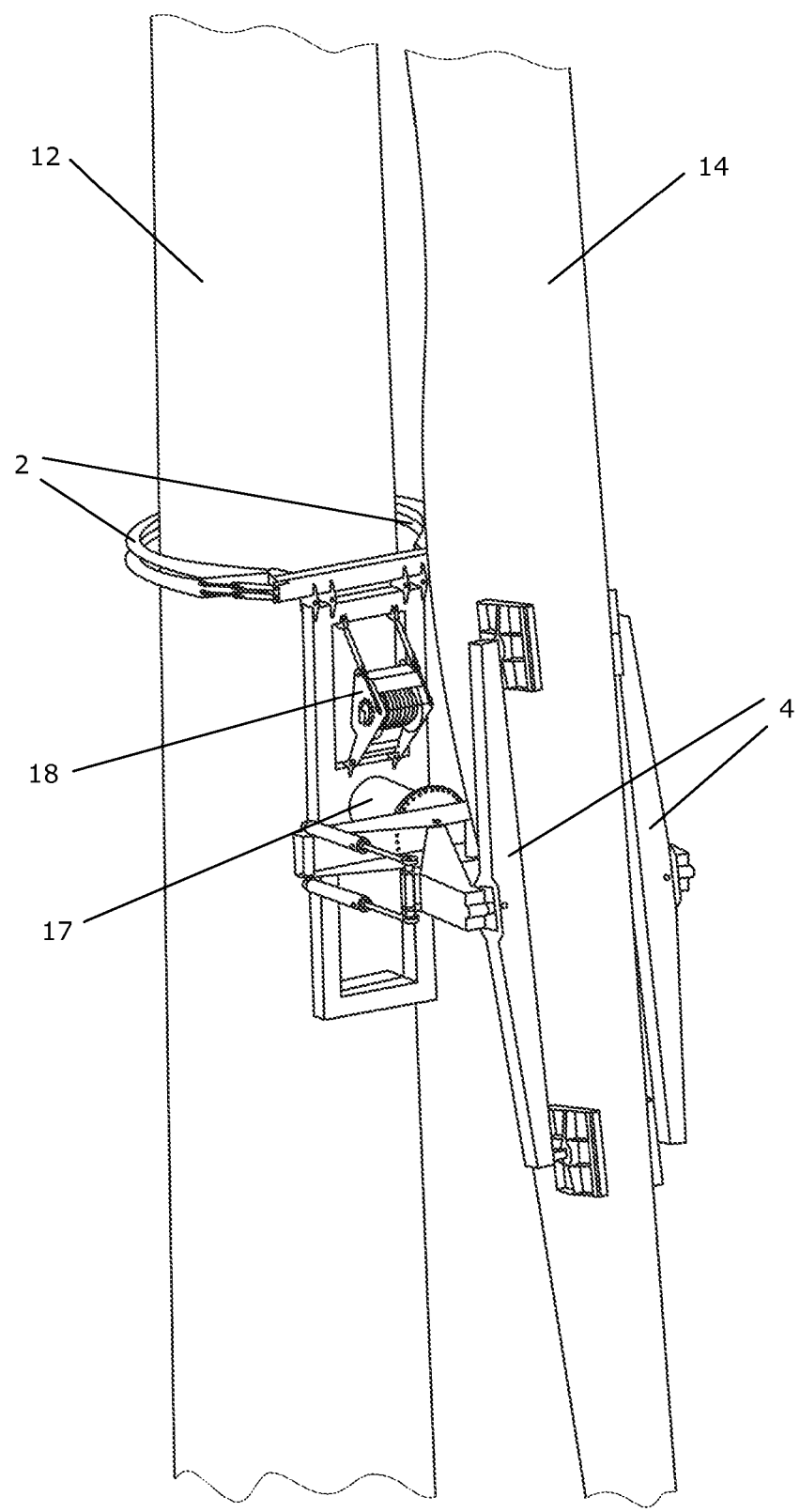
FIG. 11 illustrates a sledge with a support structure gripping around a tower and with a gripping structure with a blade fixed in a non-vertical orientation.

FIG. 11 illustrates a sledge 1 being relatively close to the top end of a turbine tower 12. The support structure grips around the tower 12 by the use of two curve-shaped arms 2 and the gripping structure fixes a blade 14 in a non-vertical orientation by the use of a set of jaws 4. After having reached a desired height, the turbine blade 14 is tilted from a substantially horizontal orientation to a substantially vertical orientation by a tilting device 17. This may e.g. be at 75 meters above ground level depending on the length of the turbine blade 14 in order to ensure sufficient space between the end of the blade 14 and the fixation point at the hub. Near the top of the turbine tower 12, the blade 14 is tilted in order to be positioned correctly in relation to the hub (not shown). The turbine blade 14 may have been elevated in a substantially horizontal position in order to limit wind load on the blade, since the size of the load may be higher when elevating the blade in a substantially vertical orientation.

The sledge 1 is adapted to be moved along the turbine tower 12 by aid of a cable connection to a hoist located at the top of the tower. The cable (not shown) is connected to a winch 18 at the sledge 1.

Figure 12:
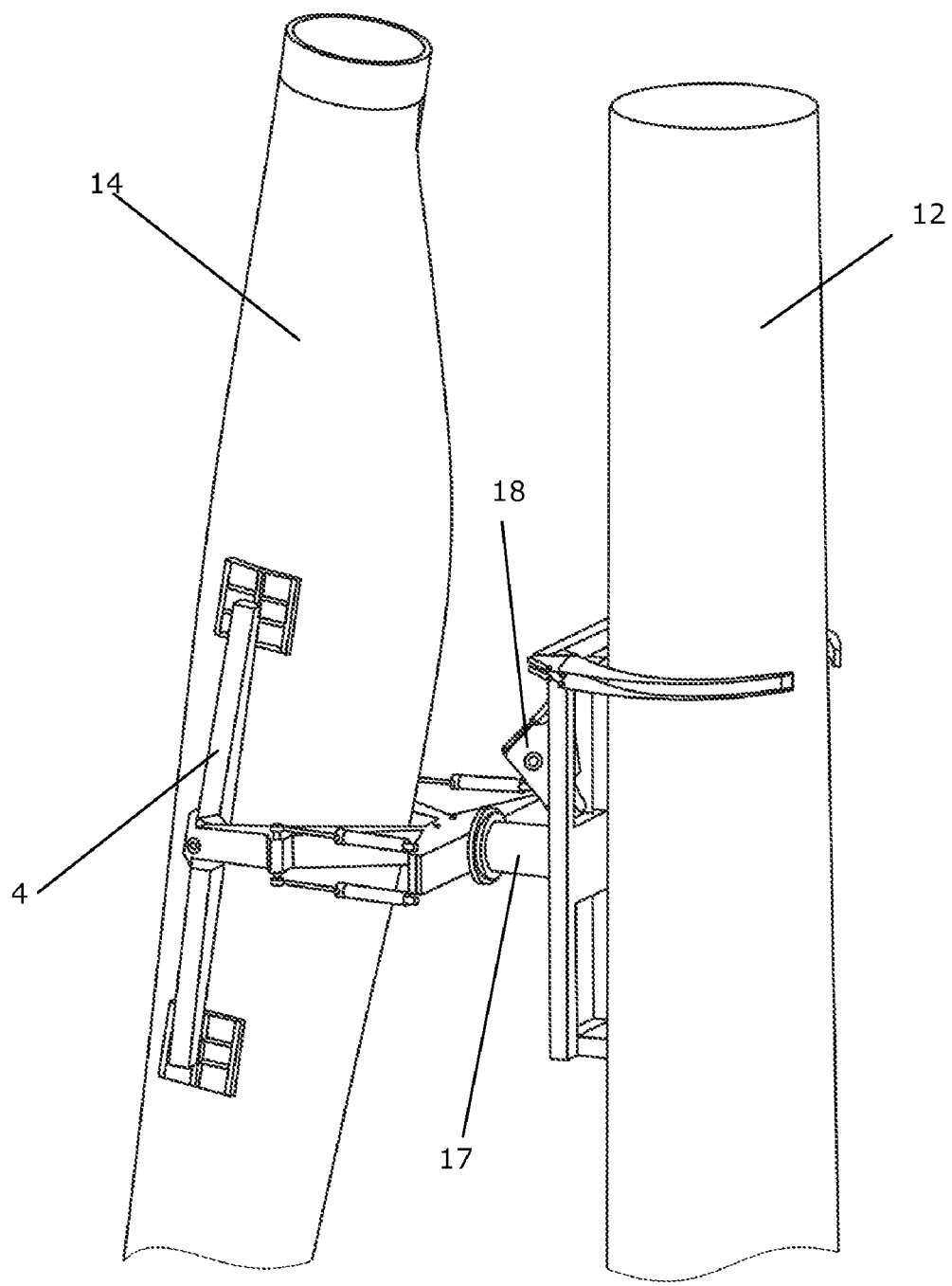
FIG. 12 illustrates a sledge close to the top of the tower with a gripping structure having a blade fixed in an orientation suitable for fixation to the hub.

In FIG. 12 the turbine blade 14 has been tilted into an orientation suitable for fixation to the hub (not shown).

Figure 13:
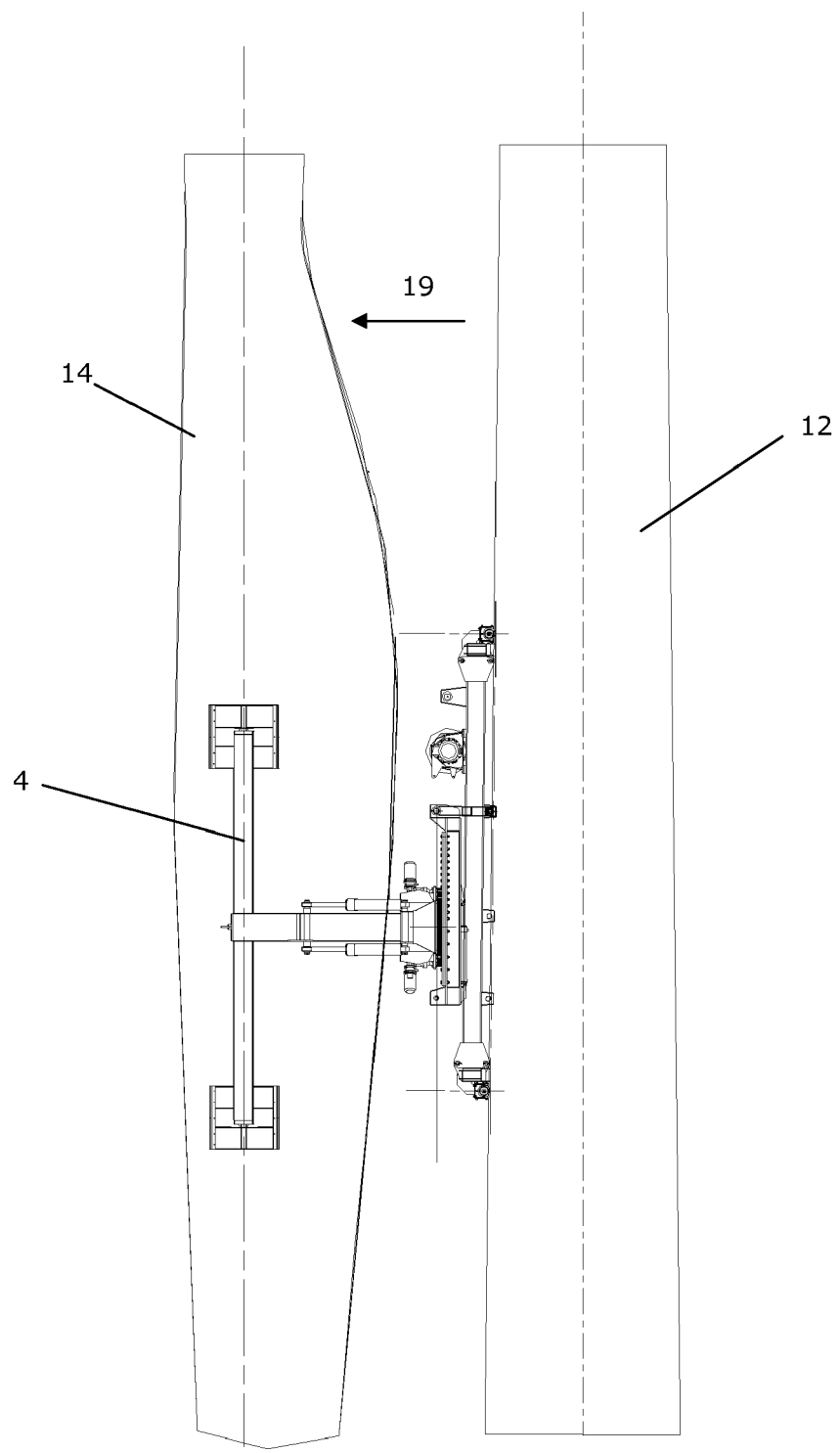
FIGS. 13 and 14 illustrate a sledge close to the top of the tower, the gripping structure being illustrated at two different angles.
Figure 14:
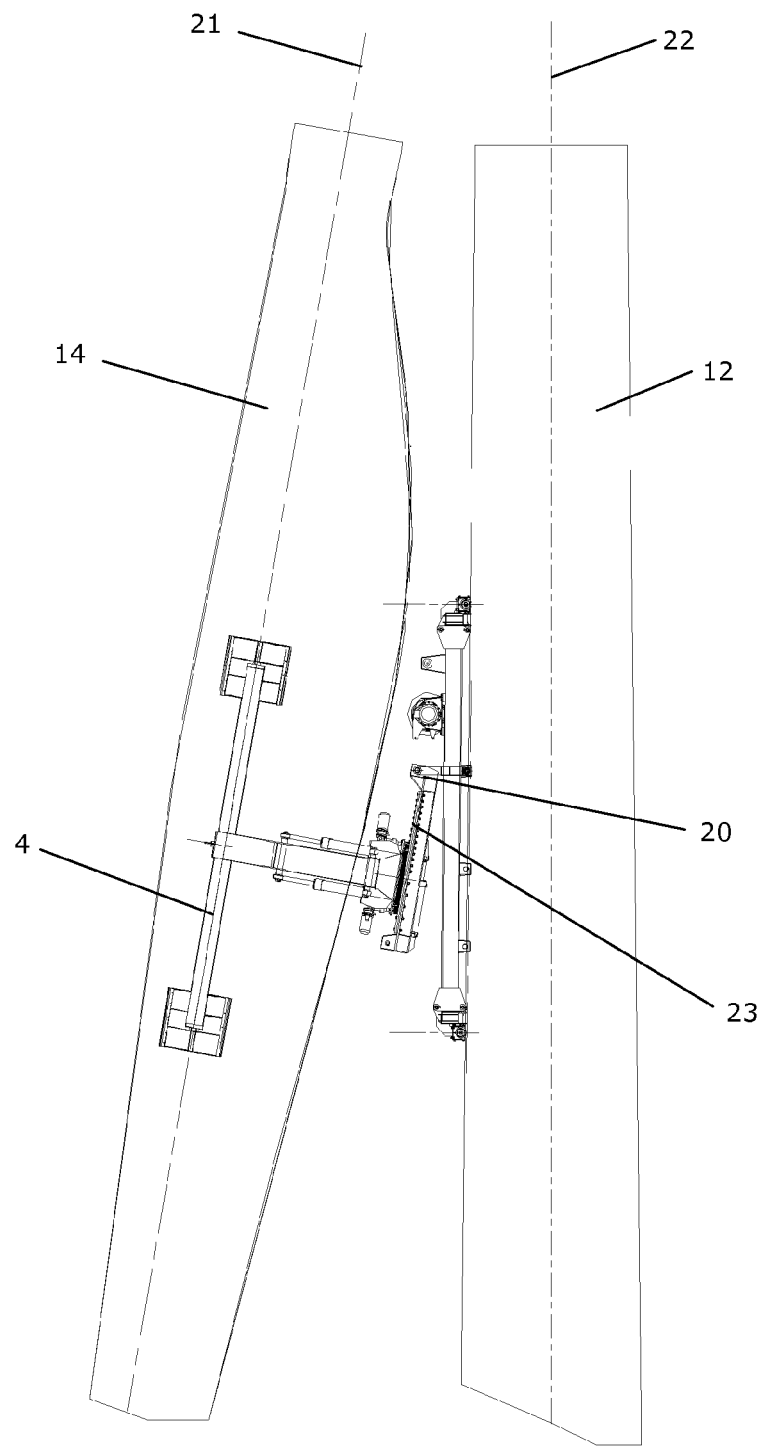

FIGS. 13 and 14 illustrate an embodiment of a sledge 1 close to the top end of the tower 12 in the proximity of the hub (not shown). The turbine blade 14 has been elevated along the turbine tower 12 in a substantially horizontal orientation. Close to the top end of the tower 12, the blade 14 has firstly been tilted approximately 90°, thus reorienting the blade 14 from a substantially horizontal orientation into a substantially vertical orientation. Subsequently, the blade 14 has been displaced substantially horizontally up to 3 meters, i.e. away from the turbine tower 12, as indicated by the arrow 19 illustrated in FIG. 13.

FIG. 14 illustrates the blade 14 having been tilted for the second time, the tilt angle being approximately 10° in order to facilitate attachment to the hub (not shown). Finally, the blade 14 is displaced for the second time by the use of the displacement structure 20.

During the second displacement of the blade 14, the blade 14 is simultaneously horizontally and vertically displaced in order to be correctly received in the hub. The movement of the blade 14 is thus in a straight path along an axis 21, the axis 21 being inclined in relation to the centre axis 22 of the turbine tower 12. The movement is carried out by sliding the gripping structure along a front part 23 of the displacement structure 20.

The invention claimed is:

1. A mounting device for mounting or demounting a wind turbine blade to or from a hub which is located at a top end of a wind turbine tower, the mounting device comprising a sledge, the sledge comprising a support structure and a gripping structure, the support structure being adapted to releasably grip the wind turbine tower and to guide the sledge along an outer surface of the wind turbine tower between a bottom end position and a top end position of the tower, the gripping structure being adapted to provide a releasable fixation of the wind turbine blade in a fixed orientation relative to the gripping structure, wherein the sledge is adapted to be moved along the tower by a combination of the support structure and a cable connection to the top end, wherein the sledge is formed to enable reorientation of the turbine blade by transfer of torque from the sledge to the wind turbine tower, and wherein the support structure comprises rollers adapted to roll on the outer surface of the wind turbine tower.

2. A mounting device according to claim 1, wherein the support structure is adapted for a first configuration in which it grips a wind turbine tower and second configuration in which it guides the sledge along an outer surface of a wind turbine tower.

3. A mounting device according to claim 1, wherein the support structure comprises two curve-shaped arms, the arms being movable away from each other towards an open position in which the support structure can be arranged in a position ready to catch an adjacent wind turbine tower and being movable toward each other to a gripping position in which the tower is caught.

4. A mounting device according to claim 1, wherein the gripping structure is adapted to fix a wind turbine blade at a balance point.

5. A mounting device according to claim 1, wherein the gripping structure comprises a set of two jaws.

6. A mounting device according to claim 5, wherein the gripping structure comprises an actuator for movement of the jaws from an open position in which a turbine blade can be arranged between the jaws to a fixation position in which the blade is fixed.

7. A mounting device according to claim 6, wherein each jaw forms two gripping points which in the closed position form contact with a turbine blade arranged between the jaws.

8. A mounting device according to claim 6, wherein the gripping structure further comprises a locking member preventing movement of the jaws from the closed position.

9. A mounting device according to claim 1, further comprising a tilt device, said tilt device being arranged between the support structure and the gripping structure to facilitate tilting of the gripping structure relative to the support structure around at least two axes.

10. A mounting device according to claim 9, wherein two of the at least two axes are perpendicular to each other and perpendicular to a central axis of a wind turbine tower when the sledge is guided along the wind turbine tower by the support structure.

11. A mounting device according to claim 1, further comprising a displacement structure adapted to displace the gripping structure relative to the sledge.

12. A mounting device according to claim 11, wherein the gripping structure is adapted for displacement in at least one direction.

13. A mounting device according to claim 11, wherein the gripping structure is adapted for displacement in a straight path at an angle to the tower.

14. A mounting device according to claim 11, wherein the gripping structure is adapted for displacement in at least two tilt angles.

15. A mounting device according to claim 1, further comprising a cable support, the cable support providing a variable point of attachment for the cable connection.

16. A mounting device for mounting or demounting a wind turbine blade to or from a hub which is located at a top end of a wind turbine tower, the mounting device comprising a sledge, the sledge comprising a support structure, a gripping structure, and a tilt device, the support structure being adapted to guide the sledge along an outer surface of the wind turbine tower between a bottom end position and a top end position of the tower, the gripping structure being adapted to provide a releasable fixation of the wind turbine blade in a fixed orientation relative to the gripping structure, and the tilt device being arranged between the support structure and the gripping structure to facilitate tilting of the gripping structure relative to the support structure around at least two axes.

17. A mounting device according to claim 16 further comprising drive means, said drive means comprising motor means for forcing the sledge along the wind turbine tower.

18. A mounting device according to claim 17, wherein the drive means further comprises a winch.

* * * * *